(12) United States Patent
Shirota et al.

(10) Patent No.: US 9,008,038 B2
(45) Date of Patent: Apr. 14, 2015

(54) RESOURCE RELEASE AT SOURCE SYSTEM DURING HANDOFF TO MULTI-RADIO ACCESS TECHNOLOGY TARGET SYSTEM

(75) Inventors: Masakazu Shirota, Kanagawa (JP); Jun Wang, La Jolla, CA (US); George Cherian, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 12/821,279

(22) Filed: Jun. 23, 2010

(65) Prior Publication Data

US 2010/0329210 A1  Dec. 30, 2010

Related U.S. Application Data

(60) Provisional application No. 61/220,126, filed on Jun. 24, 2009.

(51) Int. Cl.
*H04W 36/00* (2009.01)
*H04W 36/14* (2009.01)
*H04W 72/00* (2009.01)

(52) U.S. Cl.
CPC .......... *H04W 36/0083* (2013.01); *H04W 36/14* (2013.01); *H04W 72/00* (2013.01)

(58) Field of Classification Search
CPC .................... H04W 36/0016; H04W 36/0083; H04W 36/24; H04W 36/26; H04W 36/30; H04W 72/00; H04W 36/14

USPC ......... 370/229, 230, 235, 310, 328, 329, 331, 370/345, 347, 348, 350; 455/403, 422.1, 455/436, 437, 438, 439, 442

See application file for complete search history.

(56) References Cited

U.S. PATENT DOCUMENTS

| | | | |
|---|---|---|---|
| 6,717,916 B1 * | 4/2004 | Ahn et al. .................... | 370/252 |
| 2002/0082017 A1 * | 6/2002 | Hattori ......................... | 455/436 |
| 2005/0101328 A1 * | 5/2005 | Son et al. ..................... | 455/436 |
| 2006/0239229 A1 * | 10/2006 | Marinescu et al. ........... | 370/331 |
| 2006/0246906 A1 | 11/2006 | Vaittinen et al. | |
| 2006/0293229 A1 | 12/2006 | Fesik et al. | |
| 2008/0096560 A1 * | 4/2008 | Felske et al. ................. | 455/436 |
| 2009/0296660 A1 | 12/2009 | Weng | |

FOREIGN PATENT DOCUMENTS

| | | |
|---|---|---|
| CN | 101133672 A | 2/2008 |
| GB | 2436667 | 10/2007 |
| WO | WO2008095447 | 8/2008 |

OTHER PUBLICATIONS

International Search Report and Written Opinion—PCT/US2010/039861, International Search Authority—European Patent Office—Nov. 4, 2010.
Taiwan Search Report—TW099120674—TIPO—May 3, 2013.

* cited by examiner

*Primary Examiner* — Obaidul Huq
(74) *Attorney, Agent, or Firm* — Darren M. Simon

(57) ABSTRACT

Aspects describe coordination of resource release on a source system. An aspect relates to a network based coordination. Another aspect relates to a mobile device based coordination. Also provided is a network and mobile device coordinated approach. An un-coordinated approach is also provided.

45 Claims, 14 Drawing Sheets

RESOURCE RELEASE AT SOURCE SYSTEM DURING HANDOFF TO MULTI-RADIO ACCESS TECHNOLOGY TARGET SYSTEM

CROSS-REFERENCE

This is an application claiming priority to Provisional Application No. 61/220,126 entitled "METHOD TO PERFORM RESOURCE RELEASE AT THE SOURCE SYSTEM DURING A HANDOFF TO MULTI-RAT TARGET SYSTEM" filed Jun. 24, 2009, and assigned to the assignee hereof and hereby expressly incorporated by reference herein.

BACKGROUND

I. Field

The following description relates generally to wireless communications and more particularly to handoff to a multi-radio access technology target system.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. The forward link (or downlink) refers to the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

As a mobile device is moved from one geographic area to another geographic area, the mobile device might need to be handed off from a source network to a target network. Many times, both source network and target network utilize a single radio access technology, and, therefore, there is a one-to-one relationship with respect to the handoff. However, there might be times when target network supports a multi-radio access technology and handoff messages related to each radio access technology might be received at different times or one or more handoff messages might not be received. Thus, there is a need to coordinate handoff to a target system that supports multiple radio access technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a method for coordination of handoff to a multi-radio access technology target system. Method comprises receiving a first message to trigger a first mobility procedure and delaying action on first message. Method also comprises performing one of the following: determining a second message for a second mobility procedure is received during the delay, terminating the delay, and triggering first mobility procedure and second mobility procedure as a combined procedure; or determining second message is not received during the delay and proceeding with first mobility procedure. In accordance with some aspects, method comprises suspending services that failed to be transferred. According to some aspects, triggering comprises triggering mobility procedures for different network domains.

Another aspect relates to a wireless communications apparatus comprising a memory and a processor. Memory retains instructions related to receiving a first message for radio resource allocation for a first target radio access technology and delaying action on first message. Memory retains further instructions related to determining a second message for a second target radio access technology is received during the delay, terminating the delay, and triggering a first mobility procedure and a second mobility procedure as a combined procedure. Memory can retain further instructions related to determining second message is not received during the delay and proceeding with first mobility procedure. Processor is coupled to memory and is configured to execute instructions retained in memory A further aspect relates to a wireless communications apparatus that coordinates handoff to a multi-radio access technology target system. Wireless communications apparatus comprises means for receiving a first message for radio resource allocation for a first target radio access technology, means for postponing action on first message, and means for selectively releasing resources as a function of a length of the delay. In accordance with some aspects, wireless communications apparatus comprises means for determining a second message for a second target radio access technology is received during the delay, means for terminating the delay, and means for triggering a first mobility procedure and a second mobility procedure as a combined procedure. According to some aspects, wireless communications apparatus comprises means for determining a second message is not received during the delay and means for proceeding with first mobility procedure.

An aspect relates to a computer program product comprising a computer-readable medium. Included in computer-readable medium is a first set of codes for causing a computer to receive a first message to trigger a first mobility procedure. Also included in computer-readable medium are a second set of codes for causing computer to delay action on first message and a third set of codes for causing computer to release resources as a function of an expiration of a delay.

Another aspect relates to at least one processor configured to coordinate handoff to a multi-radio access technology target system. The at least one processor comprises a first module that receives a first message to trigger a first mobility procedure and a second module that delays action on first message. The at least one processor also comprises a third module that performs one of the following: determine a second message for a second mobility procedure is received during the delay, terminate the delay, and trigger first mobility procedure and second mobility procedure as a combined procedure; or ascertain second message is not received during the delay and proceed with first mobility procedure.

An aspect relates to a method for coordination of handoff to a multi-radio access technology target system. Method comprises receiving at a mobile device a first handoff command based on a first target radio access technology allocation and delaying action on first handoff command. Memory also comprises determining a second handoff command for a second target radio access technology allocation is received during the delay, terminating the delay, and sending to a source network a signaling message that indicates mobile device is leaving source network. Additionally or alternatively, memory comprises determining second handoff command is not received during the delay and informing source network that mobile device is leaving source network.

An aspect relates to a wireless communications apparatus comprising a memory and a processor. Memory retains instructions related to receiving a first handoff command based on a first target radio access technology allocation and delaying action on first handoff command. Memory also retains instructions related to determining a second handoff command for a second target radio access technology allocation is received during the delay, terminating the delay, and sending to a source network a signaling message that indicates wireless communications apparatus is leaving source network. Memory can retain instructions related to determining second handoff command is not received during the delay and informing source network that a mobile device is leaving source network. Processor is coupled to memory and is configured to execute instructions retained in memory.

Another aspect relates to a wireless communications apparatus that coordinates handoff to a multi-radio access technology target system. Wireless communications apparatus comprises means for receiving a first handoff command based on a first target radio access technology allocation. Wireless communications apparatus also comprises means for delaying action on first handoff command and means for selectively leaving a source network as a function of the delay. In accordance with some aspects, wireless communications apparatus comprises means for determining a second handoff command for a second target radio access technology allocation is received during the delay, means for terminating the delay, and means for sending to source network a signaling message that indicates wireless communications apparatus is leaving source network. According to some aspects, wireless communications apparatus comprises means for determining a second handoff command is not received during the delay and means for informing source network that a mobile device is leaving source network.

According to another aspect is a computer program product comprising a computer-readable medium. Included in computer-readable medium are a first set of codes for causing a computer to receive a first handoff command based on a first target radio access technology allocation and a second set of codes for causing computer to delay action on first handoff command. Also included in computer-readable medium is a third set of codes for causing computer to selectively convey to a source system an indication that a device is leaving source system.

A further aspect relates to at least one processor configured to coordinate handoff to a multi-radio access technology target system. The at least one processor comprises a first module that receives at a mobile device a first handoff command based on a first target radio access technology allocation and a second module that delays action on first handoff command.

The at least one processor also comprises a third module that determines a second handoff command for a second target radio access technology allocation is received during the delay, terminates the delay, and sends to a source network a signaling message that indicates mobile device is leaving source network. In accordance with some aspects, third module determines second handoff command is not received during the delay and informs source network that mobile device is leaving source network.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
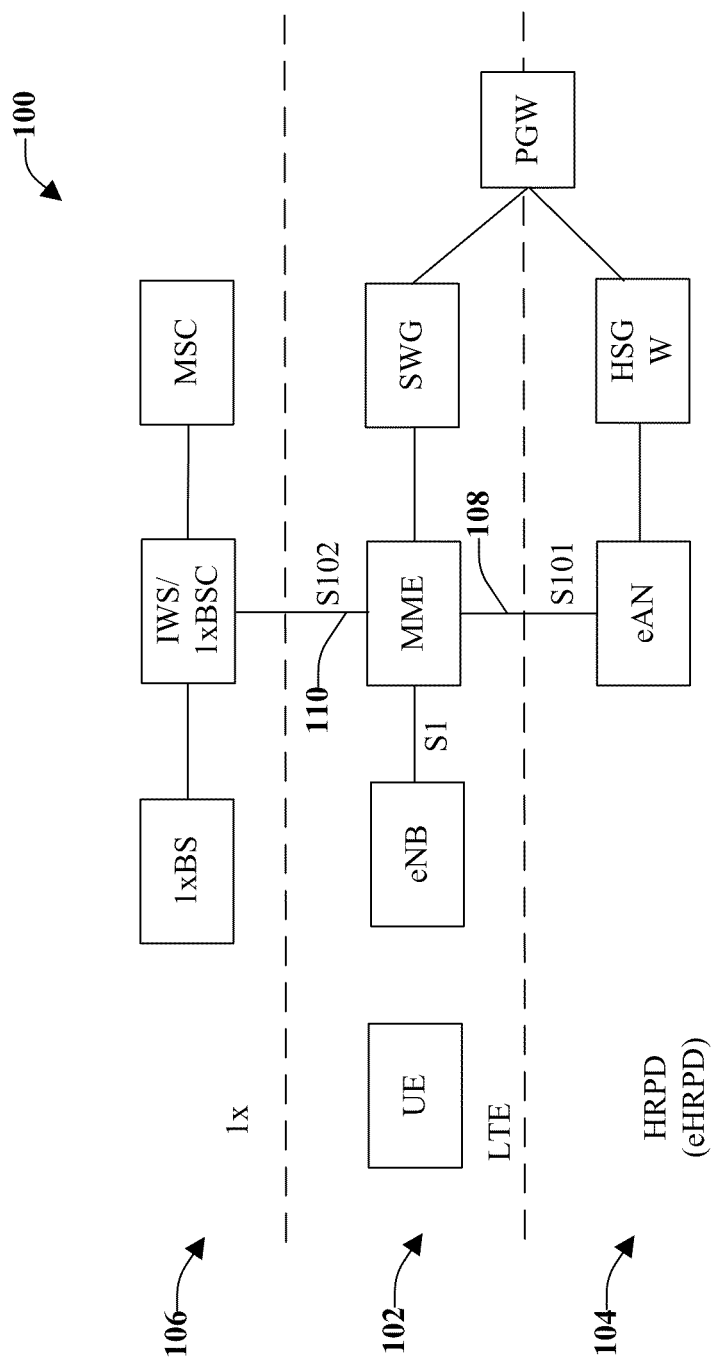
FIG. 1 illustrates an example architecture, according to an aspect.

With reference to FIG. 1, illustrated is an example architecture 100, according to an aspect. Represented are a source network 102, a first radio access technology (RAT) target system 104, and a second RAT target system 106. First RAT target system 104 and second RAT target system 106 can be different RATs. Source network 102 is illustrated as a Long Term Evolution (LTE) system, first RAT target system 104 is illustrated as a High Rate Packet Data [HRPD] (eHRPD) system, and second RAT target system 106, is illustrated as a 1x system. An HRPD system is for a data network and a 1x system is typically for a circuit switch network. The two RAT target systems 104, 106 are not coordinated with each other. LTE system can support both data and circuit switch service using a fallback procedure to 1x (e.g., LTE system does not provide the service but does provide a tunnel to exchange the circuit switch service messages).

A first tunnel interface (S101) 108 with first RAT target system 104 and a second tunnel interface (S102) 110 with second RAT target system 106 are illustrated. Tunnel establishments for first tunnel interface (S101) 108 and second tunnel interface (S102) 110 are performed independently and, therefore, there is no coordination between first RAT target system 104 and second RAT target system 106. Source network 102 needs to handoff using two independent handoff procedures at substantially the same time and there is some coordination necessary in source network 102.

First RAT target system 104 and second RAT target system 106 are operated independently and differences related to handoff can be encountered, such as different handoff processing times. Thus, even though a mobile device might send handoff messages at a similar time, the handoff completion time may be different (in time). For example, at some point in time, a traffic channel assignment may be fixed at the second RAT target system 106 while first RAT target system 104 is assigned to a channel. Further, there can be different handoff performance requirements for first RAT target system 104 and second RAT target system 106.

In summary, in the case of an optimized inter-RAT handoff from a source radio access technology (RAT) to multiple target RATs, radio-resources for each target-RAT is established independently prior to releasing the radio resource on the source system.

Allocating the target resources independently on each of the target RATs can introduce a few problems. For example, the time required to allocate resources on each of the target RATs might differ. In another example, resource allocation of one of the RATs may fail. Further, different services may have different delay requirement on how long it can wait on the source system before it can move to the target system. For example, in the case of circuit-switched fallback from LTE to CDMA2000-1x system, delaying the fall-back to CDMA2000-1x may affect the user experience. The disclosed aspects overcome these issues as well as other issued related to handoff to multi-RAT target systems.

Figure 2:
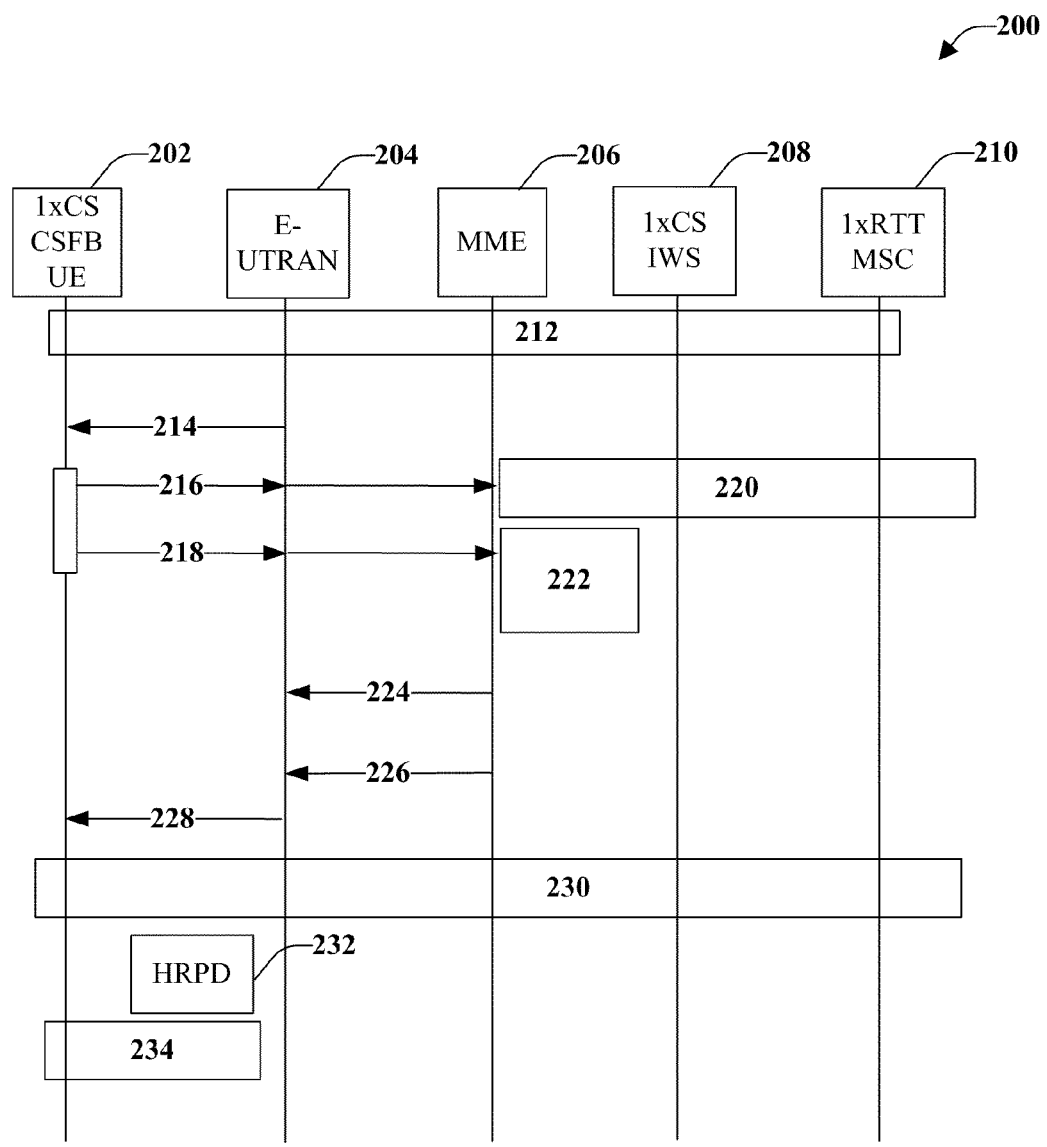
FIG. 2 illustrates an example call flow, according to an aspect.

FIG. 2 illustrates an example call flow 200, according to an aspect. Represented by blocks are a mobile device 202, a E-UTRAN 204 (or eNodeB), a Mobility Management Entity (MME 206), a 1xCS IWS 208, and a 1xRTT MSC 210.

Block 212 illustrates an ongoing data session between mobile device 202 and LTE network. At 214, is the handoff indication to mobile device 202 triggered by 1xCS fallback procedure. The handoff indication can be a HOfromEUTRAPrep. Request (3G1x parameter, RAND, con-HRPD HO indication). After receiving the message, mobile device 202 sends a first handoff message 216 and a second handoff message 218 at substantially the same time. First handoff message 216 can be an UL HO prepXfer (MEID, 1x message) and second handoff message 218 can be a UL HO prepXfer (HRPD) message. First handoff message 216 and second handoff message 218 can be encapsulated in a single message to LTE. An 1x message in first handoff message 216 (e.g., 1x) can be sent over S102 interface 220 to 1x network (e.g., S102 direct transfer and 1xMSC interworking) An HRPD message in second handoff message 218 can be sent to HRPD network though S101 interface 222 (e.g., S101 direct transfer with HRPD access node). E-UTRAN messages are not sent over the tunnels; only encapsulated other RAT messages are sent over the tunnels.

A Downlink (DL) 51 CDMA2000 tunneling (1x CSFB) occurs, which carries a 1x Handoff Message 224, and a DL 51 CDMA2000 tunneling (HRPD) occurs, which carries the HRPD assignment 226. E-UTRAN 204 (or eNodeB) coordinates the messages 224 and 226 and if the two handoff procedures are successfully performed, E-UTRAN 204 (eNodeB) sends the mobility from EUTRA command 228 (e1xCSFB ind, 1xRTT parameters, HRPD HO info). As indicated, there is only one command 228 sent to mobile device 202. At 230, mobile device tunes to 1xRTT and resumes with, for example, 3GPP2 specific procedure. An HRPD 232 is indicated and HRPD PS HO per, for example, TS 23.402, occurs at 234.

Figure 3:
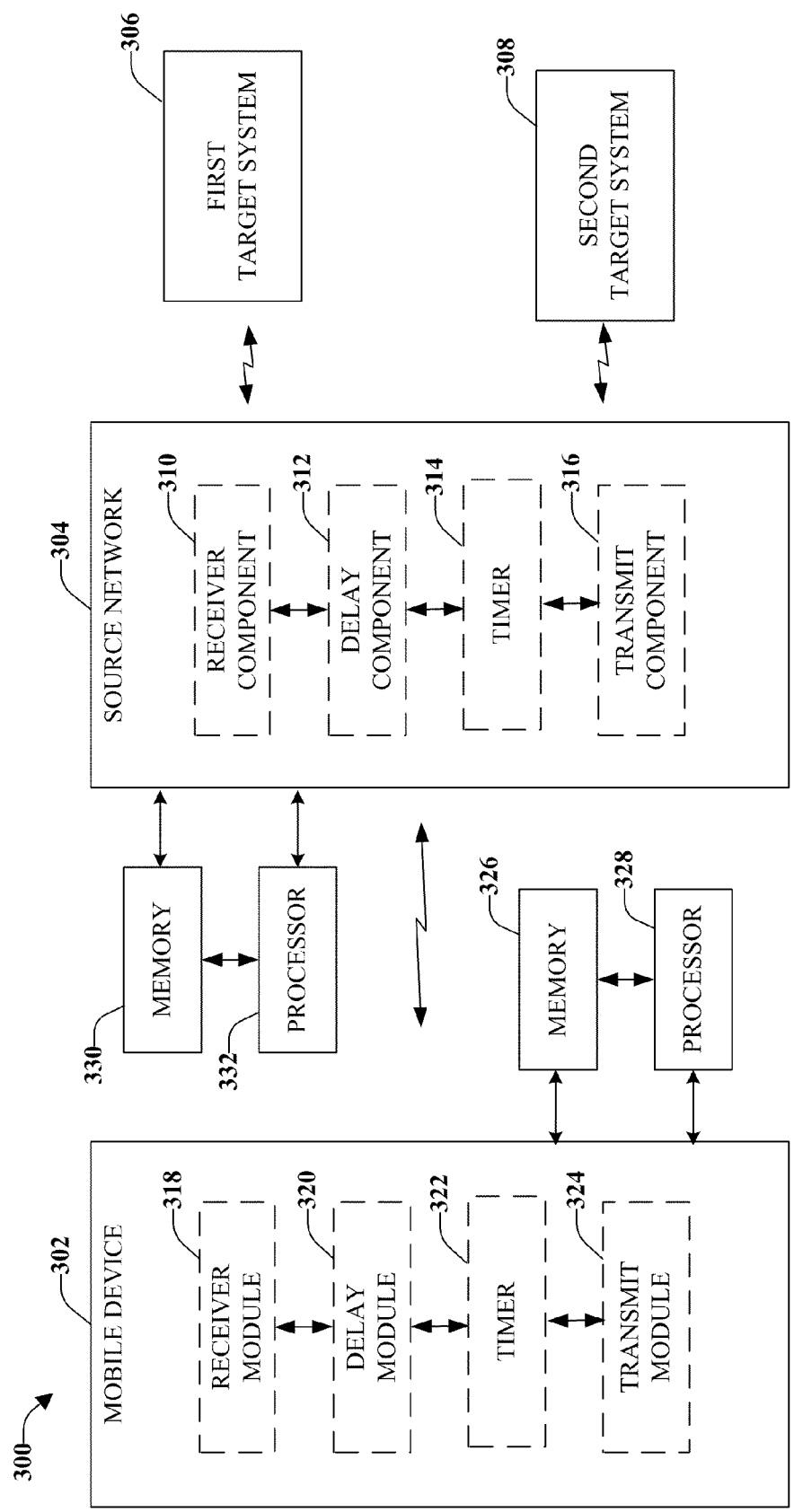
FIG. 3 illustrates a system that performs resource release at a source system during a handoff to a multi-radio access technology target system, according to an aspect.

FIG. 3 illustrates a system 300 that performs resource release at a source system during a handoff to a multi-radio access technology target system, according to an aspect. The various aspects disclosed herein are relevant to the standard 3GPP TS23.272, which is incorporated herein by reference. System 300 is employed in a wireless communications environment and includes a mobile device 302 that is communicating with a source network 304. Mobile device 302 can support multiple radio access technologies (RATs) such as LTE, HRPD, and CDMA2000-1x. Also included in system 300 are a first target RAT 306 and a second target RAT 308, which can be different RATs. In an example, source network 304 can be an LTE-packet-data session that is configured to perform simultaneous, or substantially simultaneous, circuit-switched fall-back to CDMA2000-1x and packet-data session handoff to HRPD.

There is an ongoing session between mobile device 302 and source network 304 and the mobile device 302 is to handoff to a multi-RAT target system that comprises first target RAT 306 and at least second target RAT 308. There are different aspects for performing the coordination between mobile device 302 and source network 304. According to an aspect, is a source network 304 based approach, wherein source network 304 performs handoff coordination. According to another aspect is a mobile device 302 based approach, wherein mobile device 302 performs handoff coordination. According to another aspect, an approach for handoff to a multi-RAT target system includes mobile device 302 and source network 304 based coordination. In accordance with a further aspect is an un-coordinated approach.

In a source network 304 based approach, source network 304 coordinates resource allocation for each target-RAT (e.g., first target RAT 306, second target RAT 308). Included in source network 304 is a receiver component 310 that is configured to receive radio resources allocated for mobile device 302. A delay component 312 is configured to initiate a delay at substantially the same time as radio resources are allocated for first target RAT 306. A delay can be imposed for source network 304 to retain the handoff command for a certain period of time in anticipation of receiving handoff from another RAT (e.g., second target RAT 308). In accordance with some aspects, delay component 312 is associated with a timer 314, which is started at about the same time as the radio resources are allocated. In accordance with some aspects, timer 314 is started when a resource partition to perform handoff to first target RAT 306 is ready. According to an aspect, a timer value is set based on a Quality of Service (QoS) requirement (e.g., delay requirement, jitter, bandwidth, and so forth). In accordance with some aspects, timer can be a QoS/service based timer and delay component 312 can start QoS/service based timer to coordinate handoff to different RATs that provide different services.

If all the radio resources (e.g., for second target RAT 308 and any other target RATs) are received before timer 314 expires, delay component 312 stops timer 314 and a transmit component 316 conveys the handover command to mobile device 302. Handover command comprises radio resource information for all allocated target RATs. In accordance with some aspects, handoff command comprises multiple radio access technology radio resource information.

If timer 314 expires prior to receiver component 310 receiving all the target RAT radio resources, transmit component 316 sends a handover command to mobile device 302, wherein handover command contains radio resource information of only the target RATs that allocated radio resources. In accordance with some aspects, source network 304 can suspend all the services that failed to be transferred to the target RATs due to the radio resource allocation failure. For example, if CDMA2000-1x resources are allocated and HRPD resources are not allocated before expiration of timer, eNB initiates a handoff to mobile device, wherein the handoff contains only CDMA2000-1x resources. In addition, MME also suspend the packet data session on LTE.

In a mobile device 302 based approach, transmit component 316 sends the handoff for each target RAT at about the same time as received by receiver component 310. Thus, mobile device 302 obtains, at a receiver module 318, the handoff based on each target RAT independently. A delay module 320 can initiate a delay at about the same time as first target RAT allocation is received. The delay can be initiated in order to hold off the handoff command for a certain period of time in anticipation of receiving handoff from another RAT. Delay module 320 can be associated with a timer 322 that has a certain duration and is started when handoff to the first RAT is received. In accordance with some aspects, timer 322 is a QoS/service based timer that is started to coordinate handoffs to different RATs that provide different services.

If handoff based on all requested target RATs is received, at receiver module 318, before expiration of timer 322, timer 322 is stopped and a new signaling message is sent to source network 304, by a transmit module 324. New signaling message informs source network 304 that mobile device 302 is leaving the source network 304.

If timer 322 expires before mobile device 302 receives all the handoffs based on requests target RATS, mobile device 302 informs source network 304 that mobile device is leaving source network 304. In accordance with some aspects, source network 304 may suspend the services that failed to be transferred to target system due to target RAT radio resource failure.

For a mobile device 302 and source network 304 based coordinated approach, source network 304 (e.g., Radio Access Network RAN, such as eNB) starts timer 314 when handoff to first RAT is delivered, by transmit component 316, to mobile device 302. A value of timer 314 is also send to mobile device 302. Mobile device 302 starts its timer 322, at about the same time as handoff to first RAT is received at receiver module 318. In accordance with some aspects, a value of timer 322 is set at a value that is shorter than value of network timer 314. In accordance with some aspects, value of timer 322 is equal to value of timer 314 that is started on source network 304. In accordance with some aspects, mobile device 302 holds off the handoff command for a certain period of time (e.g., value of timer 322) in anticipation of receiving handoff from another RAT. Timer 322 can be started at about the same time as mobile device 302 receives handoff to first RAT. In accordance with some aspects, timer 322 is a QoS/service based timer that is started to coordinate handoffs to different RATs that provide different services.

If mobile device 302 received handoffs to all requested RATs, or when timer 322 expires, mobile device leaves source network 304. At about the same time as timer 314 expires, source network 304 releases the resources on source network. Source network 304 can suspend services that failed to be transferred to target system due to target RAT radio resource failure. In accordance with some aspects, resource release can be based on "waiting-for-handover" timer that is started on both mobile device and on network.

For an un-coordinated based approach, source network 304 (through transmit component 316) sends handoff to first RAT to mobile device 302 at substantially the same time as received by receiver component 310. At about the same time as receiving the handoff (at receiver module 318), delay module 320 starts timer 322.

At about the same time as receiving handoff to all requested RATs, or when timer 322 expires, mobile device leaves source network 304. In accordance with some aspects, source network 304 starts timer 314 at about the same time as receiving handoff. In accordance with some aspects, a value of timer 322 is less than (e.g., a shorter value) or equal to a value of timer 314.

In accordance with some aspects, source network 304 can start a supervision procedure. During supervision procedure, source network 304 stops receiving Channel Quality Indicator (CQI) measurements. In accordance with some aspects, if at least one handover command has been delivered to mobile device 302, source network 304 may suspend services that failed to be transferred to target system due to target RAT radio resource failure.

System 300 can include memory 326 operatively coupled to mobile device 302. Memory 326 can be external to mobile device 302 or can reside within mobile device 302. Memory 326 can store instructions related to receiving a first handoff command based on a first target radio access technology allocation and delaying action on the first handoff command. Memory 326 retains further instructions related to determining a second handoff command for a second target radio access technology allocation is received during the delay, terminating the delay, and sending to a source network a signaling message that indicates mobile device is leaving the source network. In accordance with some aspects, memory 326 retains further instructions related to determining the second handoff command is not received during the delay and informing the source network that mobile device is leaving the source network.

According to some aspects, memory 326 retains further instructions related to receiving an indication that at least one service is suspended, wherein the at least one service failed to transfer to a second target radio access technology. In accordance with some aspects, memory 326 retains further instructions related to operating a timer to determine a length of the delay on the first handoff command. Memory 326 can retain further instructions related to receiving a value of a network timer and setting the timer at a value that is less than the value of the network timer. According to some aspects, memory 326 retains further instructions related to receiving a value of a network timer and setting the timer at a value that is equal to the value of the network timer.

In accordance with some aspects, memory 326 retains further instructions relates to postponing a handoff command in anticipation of a second handoff command. According to some aspects, memory 326 retains further instructions related to coordinating handoff to a first radio access technology and a second radio access technology.

At least one processor 328 can be operatively connected to mobile device 302 (and/or memory 326) to facilitate analysis of information related to coordinating handoff to a multi-radio access technology target system. Processor 328 can be a processor dedicated to analyzing and/or generating information received by mobile device 302, a processor that controls one or more components of system 300, and/or a processor that both analyzes and generates information received by mobile device 302 and controls one or more components of system 300.

A memory 330 can be operatively connected source network 304. Memory 330 can retain instructions related to receiving a first message for radio resource allocation for a first target radio access technology and delaying action on the first message. Memory 330 can retain further instructions related to determining a second message for a second target radio access technology is received during the delay, terminating the delay, and triggering a first mobility procedure and a second mobility procedures as a combined procedure. In accordance with some aspects, memory 330 retains further instructions related to determining the second message is not received during the delay and proceeding with the first mobility procedure.

In accordance with some aspects, memory 330 retains further instructions related to operating a timer to determine a length of the delay on the first message. Memory 330 can retain instructions related to determining the length of the delay based at least in part on a quality-of-service information for services provided to a mobile device. Memory 330 retains further instructions related to providing the services to the mobile device over packet-switched bearers.

According to some aspects, memory 330 retains further instructions related to determining a length of the timer based at least in part on a network domain associated with the first mobility procedure. Memory 330 retains further instructions related to setting a length of the delay to a first value if the first mobility procedure relates to a packet-switched domain and to a second value if the first mobility procedure relates to a circuit-switched domain. In accordance with some aspects, memory 330 retains further instructions related to setting the first value less than the second value.

According to some aspects, memory 330 retains further instructions related to triggering a circuit-switched handover and a packet-switched handover. In accordance with some aspects, memory 330 retains further instructions related to using the circuit-switched handover to provide a voice call on a radio access technology supporting circuit-switched voice.

At least one processor 332 can be operatively connected to source network 304 (and/or memory 330) to facilitate analysis of information related to coordinating handoff to a multi-radio access technology target system. Processor 332 can be a processor dedicated to analyzing and/or generating information received by source network 304, a processor that controls one or more components of system 300, and/or a processor that both analyzes and generates information received by source network 304 and controls one or more components of system 300.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
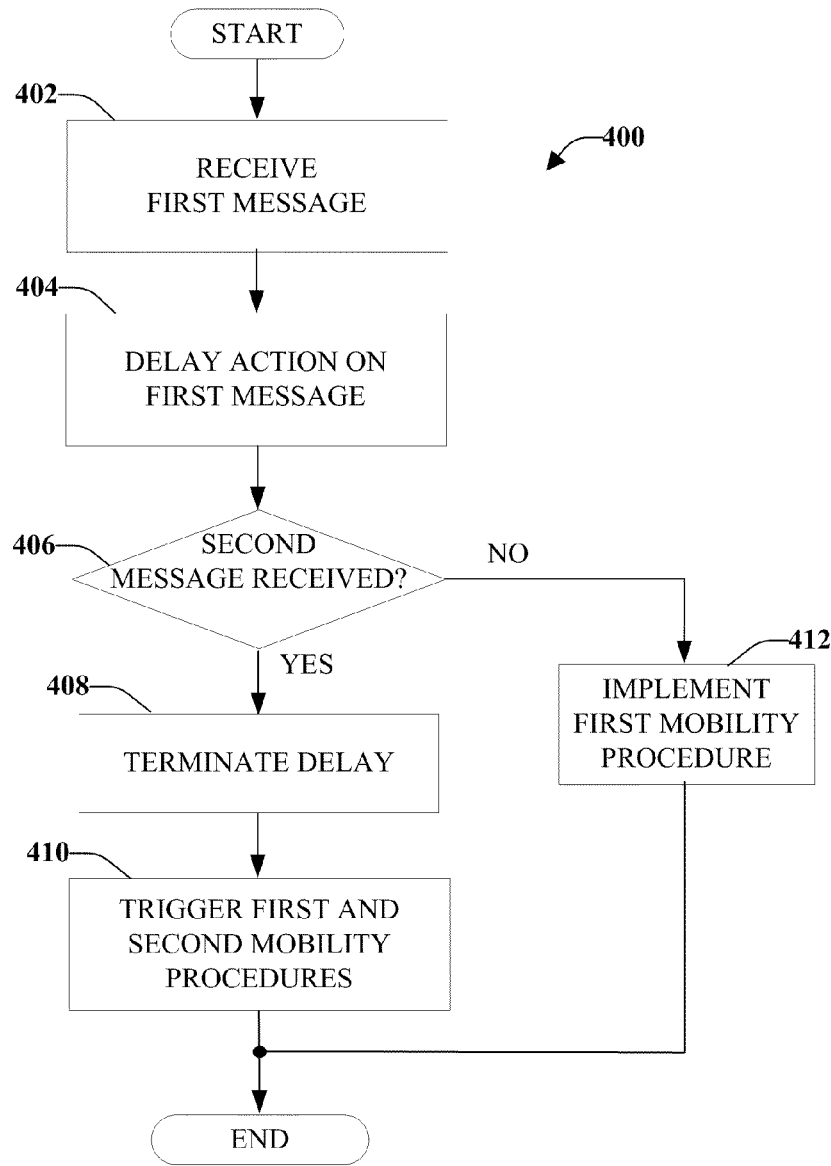
FIG. 4 illustrates a method for coordinating triggering messages for handoff to a multi-radio access technology target system, according to an aspect.

FIG. 4 illustrates a method 400 for coordinating triggering messages for handoff to a multi-RAT target system, according to an aspect. Method 400 can be performed by a network entity. Method 400 starts, at 402, when a first message is received. The first message can be to trigger a first mobility procedure. Action on the first message is delayed, at 404. In accordance with some aspects, a timer is operated to determine a length of delay on first message. In an aspect, length of delay is determined based at least in part on a Quality-of-Service (QoS) information for services provided to a mobile device. The services can be provided to mobile device over packet-switched bearers.

In accordance with some aspects, length of timer is determined based at least in part on a network domain associated with first mobility procedure. According to an aspect, length of delay is set to a first value or a second value. If first mobility procedure relates to a packet-switched domain, length of delay is set to first value. If first mobility procedure relates to a circuit-switched domain, length of delay is set to a second value. In accordance with some aspects, first value is less than second value. For example, if values are represented by time, first value is shorter in time than second value.

At 406, a determination is made whether a second message is received. The second message can be a request to trigger a second mobility procedure. If second message is received ("YES"), at 408, the delay is terminated. At 410, the first mobility procedure and the second mobility procedure are triggered as a combined procedure.

If the determination, at 406, is that the second message is not received during the delay ("NO"), method 400 continues, at 412, and the first mobility procedure is implemented.

Figure 5:
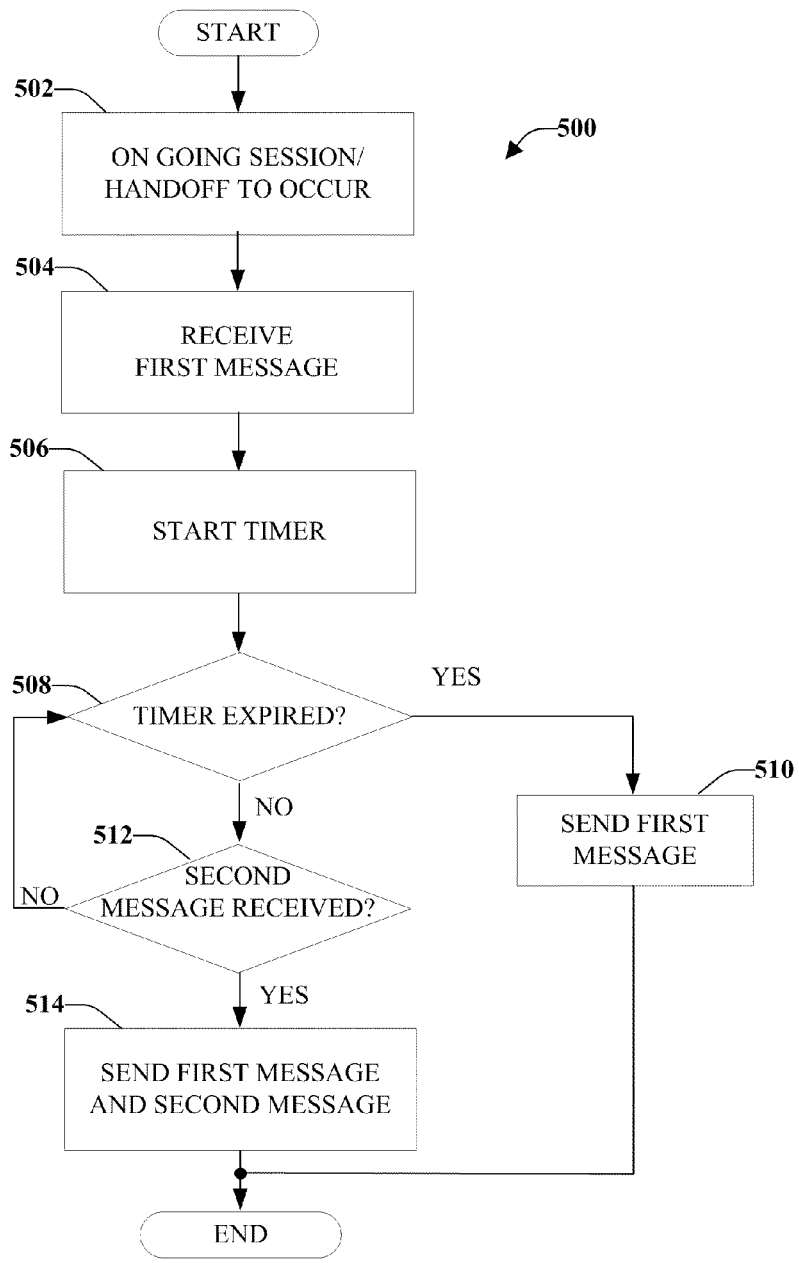
FIG. 5 illustrates a method for coordination of resource allocation, according to an aspect.

FIG. 5 illustrates a method 500 for coordination of resource allocation, according to an aspect. Method 500 can be performed by a network entity, such as a MME or an eNodeB. Resource allocation can be coordinated for each target-RAT.

Method 500 starts, at 502, with an ongoing session with a user equipment. The ongoing session can be a data session. During the ongoing session, it might be determined that a handoff should occur.

At 504, a first message is received from a first radio access technology. Based on the first message, radio-resources can be allocated for first target-RAT. At about the same time as first message is received, a timer is started, at 506. In accordance with some aspects, the timer value can be established based on a Quality of Service (QoS) requirement (delay requirement, jitter, bandwidth, and so forth).

At 508, a determination is made whether the timer has expired. If expired, first message is sent to the mobile device, at 510. If timer has not expired ("NO"), a determination is made, at 512, whether second message has been received. If not received ("NO"), method 500 continues, at 508. If second message has been received (and timer has not expired), at 514, both the first message and the second message are sent to mobile device.

Figure 6:
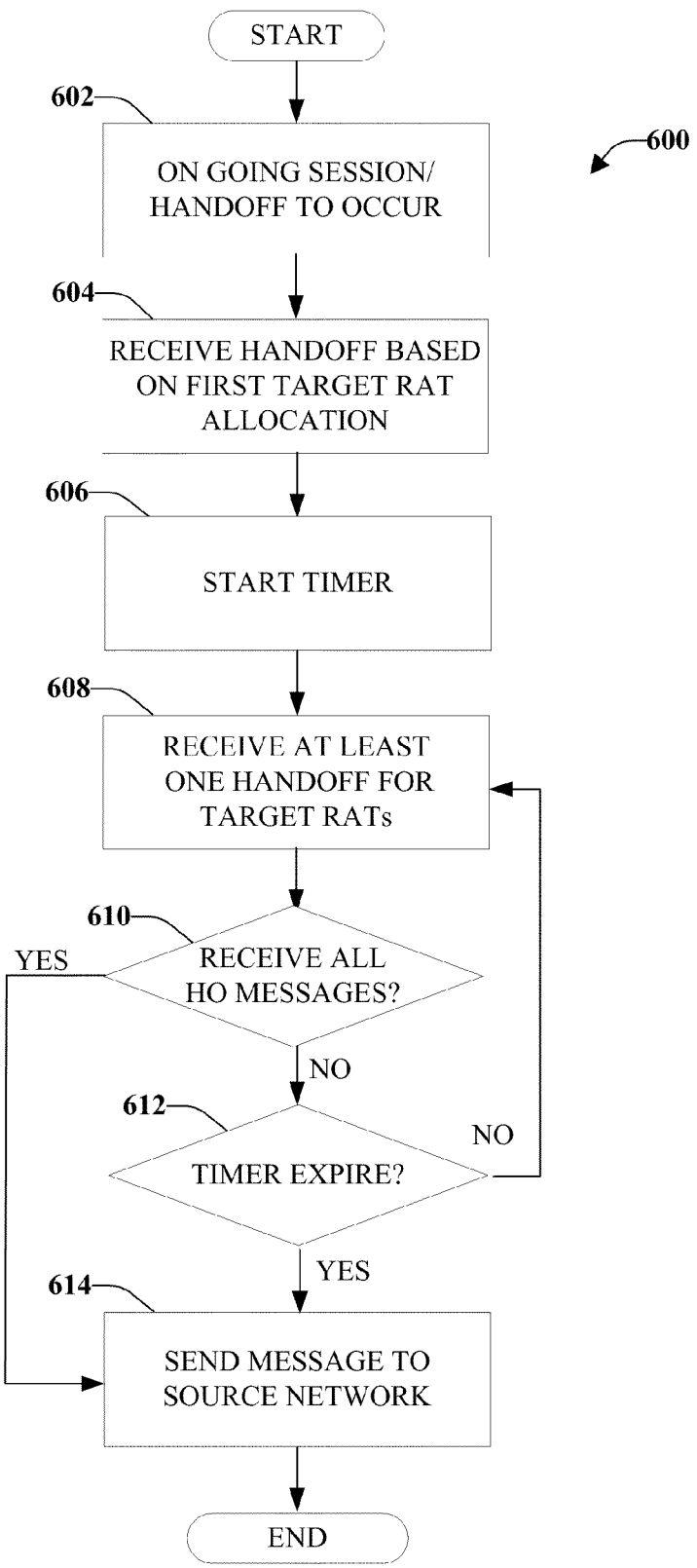
FIG. 6 illustrates a method for handoff to multi-radio access technology target system, wherein handoff based on each target radio access technology is received independently, according to an aspect.

FIG. 6 illustrates a method 600 for handoff to a multi-RAT target system, wherein handoff based on each target RAT is received independently, according to an aspect. Method 600 can be performed by a mobile device and starts, at 602, with ongoing communication with a source system. Mobile device is to handoff to at least two target systems, wherein each target system has a different RAT. At 604, a first target RAT allocation is received from source system. In accordance with this aspect, source system sends the RAT allocations at substantially the same time as received at source system. At 606, a timer is started. The trigger for starting the timer is receipt of the first target RAT allocation. The timer has a validity period that is established to allow for a period of time for receipt of handoff from another RAT. In accordance with some aspects, the timer is a QoS/service based timer that has a validity period to coordinate handoffs to different RATS that provide different services.

Method 600 continues, at 608, when handoff for one or more requested target RATs is received (and timer has not expired). At 610, a determination is made whether all handoff messages are received. If all handoff messages are not received ("NO"), method 600 continues at 612, where, a determination is made whether timer has expired. If timer has expired ("YES") and mobile device has not received all handoffs based on requested target RATS, at 614, a notification is sent to source system that mobile device is leaving source system (and handing off to those systems for which an RAT allocation was received). If timer has not expired, method can continue, at 608.

In accordance with some aspects, method 600 can continue with suspension of services that failed to be transferred to target system due to target RAT radio resource failure.

If the determination, at 610, is that all handoff messages are received ("YES") method 600 continues, at 614, when a notification is sent to source network to inform source network that mobile device is leaving source network.

Figure 7:
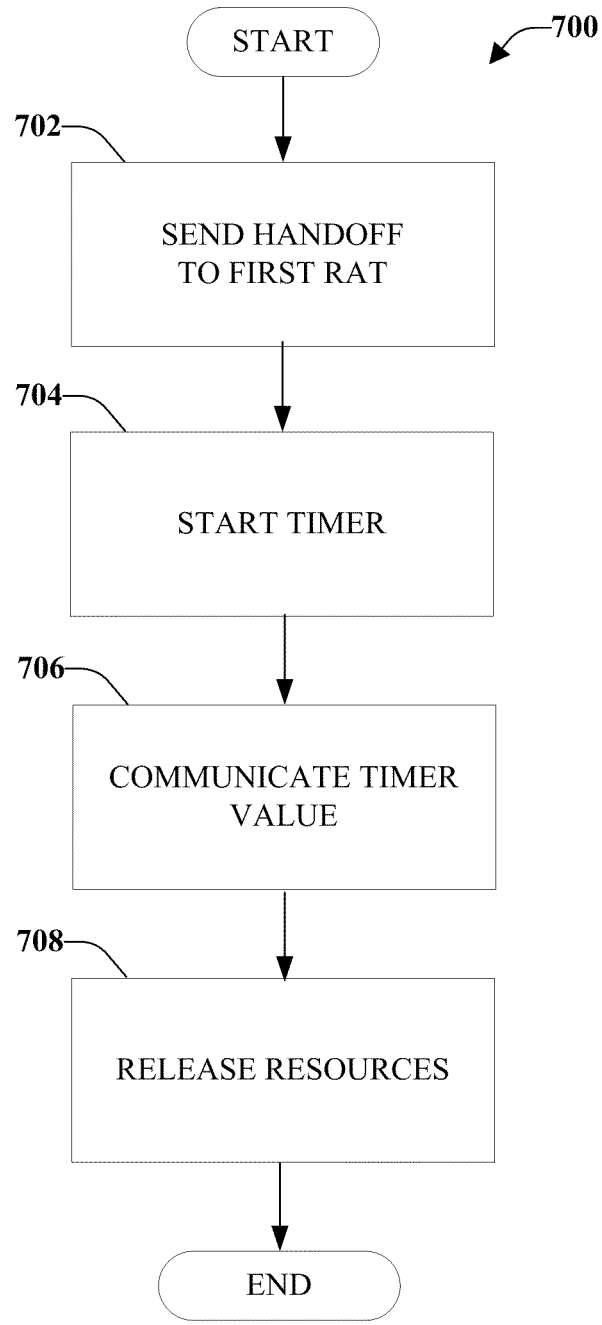
FIG. 7 illustrates a method for a coordinated approach for handoff to multi-radio access technology systems, according to an aspect.

With reference now to FIG. 7, illustrated is a method 700 for a coordinated approach for handoff to multi-RAT systems, according to an aspect. Method 700 can be performed by source system and starts, at 702, when handoff to a first RAT is sent to a mobile device. A timer is started, at 704. A value of the timer is communicated to mobile device, at 706. In accordance with some aspects, timer value is communicated at a different time or at about the same time as handoff to first RAT is sent. At 708, resources are released. The release of resources can be triggered by expiration of the timer, which was started, at 704. In accordance with some aspects, method 700 continues with suspension of services that failed to be transferred to the target system due to target RAT radio resource failure.

Figure 8:
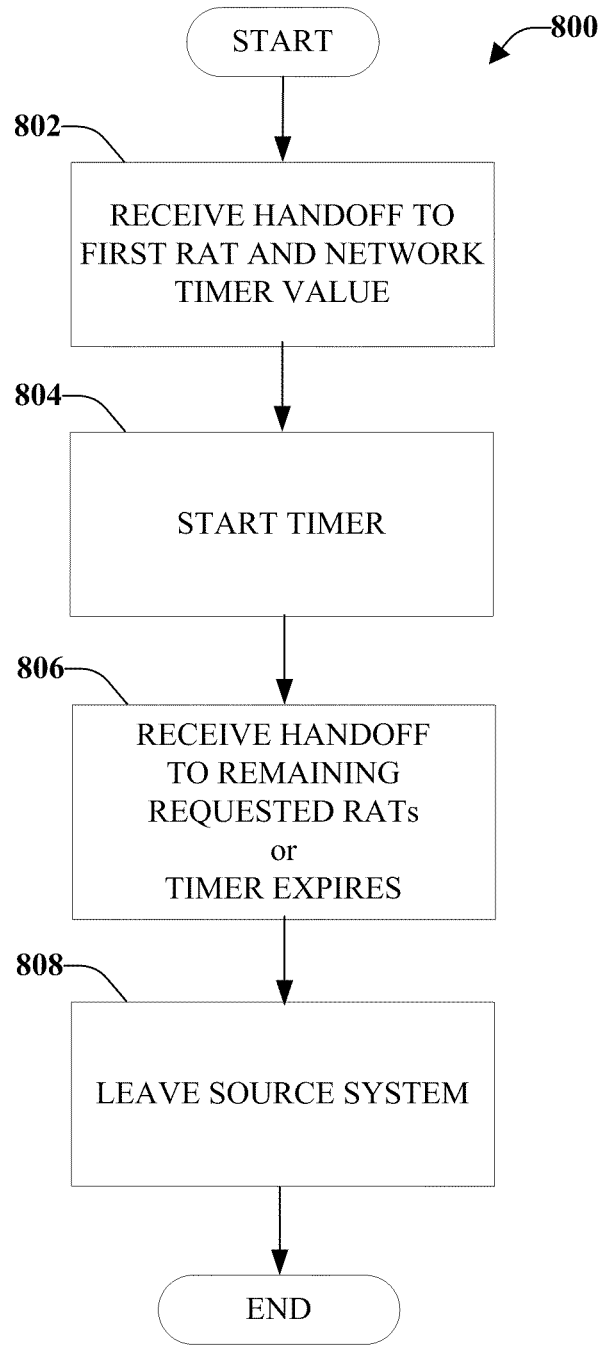
FIG. 8 illustrates another method for a coordinated approach for handoff to multi-radio access technology systems, according to an aspect.

FIG. 8 illustrates another method 800 for a coordinated approach for handoff to multi-RAT systems, according to an aspect. Method 800 can be performed by a mobile device. At 802, a handoff to a first-RAT and a source system timer value are received. The handoff to first-RAT and source system timer value can be received in different messages. At 804, a timer is started. A value of timer can be shorter than the source system timer value. In accordance with some aspects, value of timer is the same as source system timer value. At 806, handoff to the remaining RATs is received or timer expires. At 808, mobile device leaves source system.

In accordance with some aspects, a mobile device and network based un-coordinated approach can be utilized. For an un-coordinated approach, source system sends handoff messages to mobile device at substantially the same time as received by source system. Source system also starts a timer and can convey a value of timer to mobile device. When mobile device receives a handoff to first-RAT mobile device starts a timer. A value of timer can be less than or equal to a value of a timer that is started at source system. If mobile device receives handoff to all requested RATs, or when timer expires on mobile device, then mobile device leaves source system.

Source system can start a supervision procedure when source system stops receiving CQI measurements and if at least one handover command has been delivered to mobile device. In accordance with some aspects, source system may suspend services that failed to be transferred to target system due to target RAT radio resource failure. In accordance with some aspects, resource release is based on timers that are started on both mobile device and on source system.

In accordance with some aspects, a computer program product can include a computer-readable medium that comprises codes for carrying out various aspects of methods disclosed herein. Computer-readable medium can include a first set of codes for causing a computer to receive a first handoff command based on a first target radio access technology allocation and a second set of codes for causing the computer to delay action on the first handoff command. Computer-readable medium can also include a third set of codes for causing the computer to selectively convey to a source system an indication that a device is leaving the source system.

In accordance with some aspects, computer-readable medium comprises a fourth set of codes for causing the computer to determine a second handoff command for a second target radio access technology allocation is received during the delay. Also included is a fifth set of codes for causing the computer to terminate the delay and a sixth set of codes for causing the computer to send to the source system a signaling message that indicates the device is leaving the source system.

According to some aspects, computer-readable medium comprises a fourth set of codes for causing the computer to determine a second handoff command is not received during the delay. Also included in computer-readable medium is a fifth set of codes for causing the computer to inform the source system that the device is leaving the source system.

In accordance with some aspects, computer-readable medium can include a first set of codes for causing a computer to receive a first message to trigger a first mobility procedure and a second set of codes for causing the computer to delay action on the first message. Computer-readable medium also comprises a third set of codes for causing the computer to release resources as a function of an expiration of a delay.

According to some aspects, computer-readable medium comprises a fourth set of codes for causing the computer to determine a second message for a second mobility procedure is received during the delay. Also included is a fifth set of codes for causing the computer to terminate the delay and a sixth set of codes for causing the computer to trigger the first mobility procedure and the second mobility procedure as a combined procedure.

According to some aspects, computer-readable medium comprises a fourth set of codes for causing the computer to determine a second message is not received during the delay and a fifth set of codes for causing the computer to proceed with the first mobility procedure.

Figure 9:
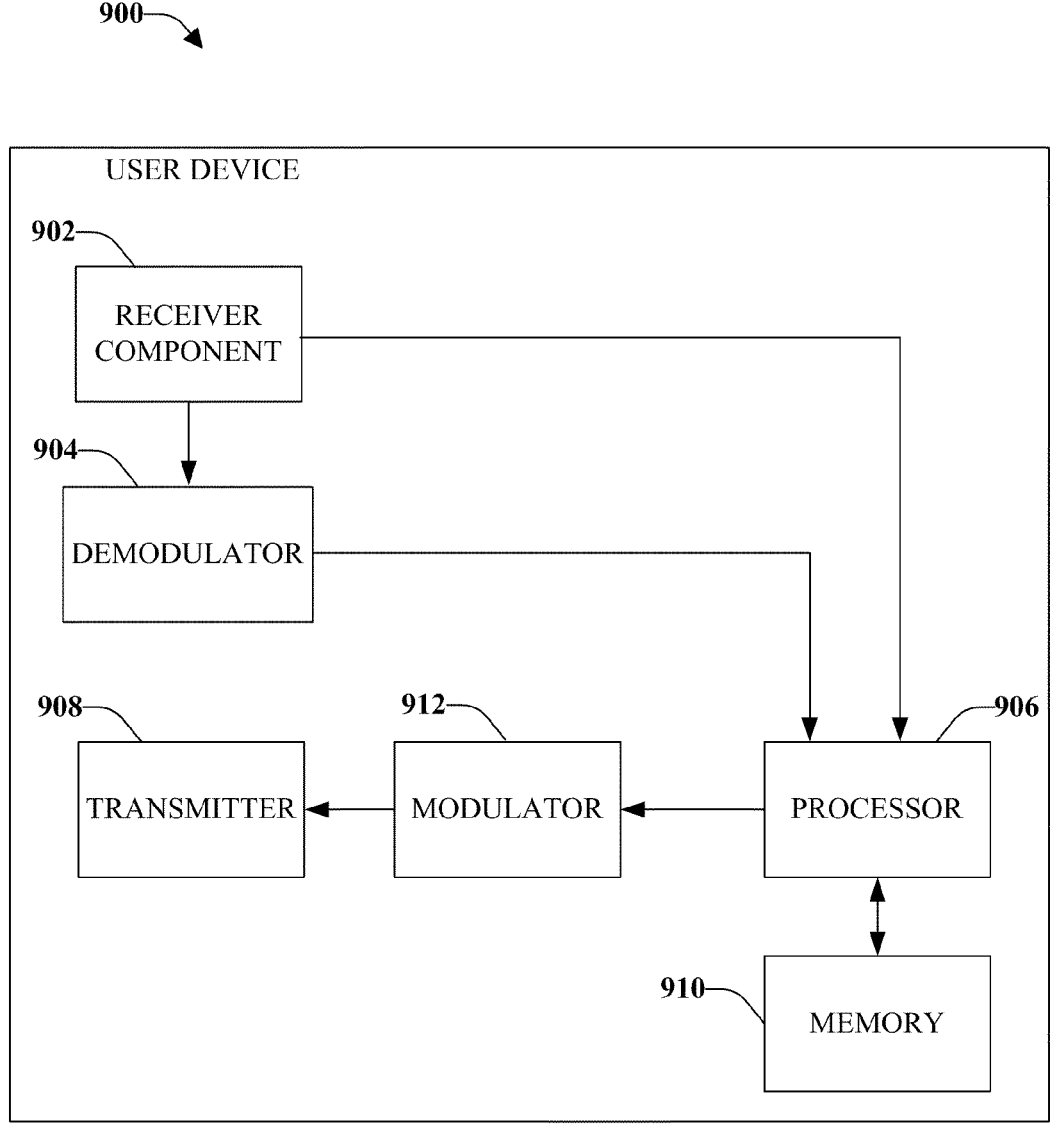
FIG. 9 illustrates a system that facilitates resource release at a source system during a handoff to a multi-radio access technology target system, in accordance with one or more of the disclosed aspects.

With reference now to FIG. 9, illustrated is a system 900 that facilitates resource release at a source system during a handoff to a multi-radio access technology target system, in accordance with one or more of the disclosed aspects. System 900 can reside in a user device. System 900 comprises a receiver component 902 that can receive a signal from, for example, a receiver antenna. Receiver component 902 can perform typical actions thereon, such as filtering, amplifying, downconverting, etc. the received signal. Receiver component 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of system 900, analyze information received by receiver component 902, generate information for transmission by transmitter 908, and/or control one or more components of system 900. Processor 906 may include a controller component capable of coordinating communications with additional user devices.

In accordance with some aspects, processor 906 is configured to coordinate handoff to a multi-radio access technology target system. Processor 906 can include a first module that receives at a mobile device a first handoff command based on a first target radio access technology allocation and a second module that delays action on the first handoff command. Processor 906 can also include a third module that determines a second handoff command for a second target radio access technology allocation is received during the delay, terminates the delay, and sends to a source network a signaling message that indicates the mobile device is leaving the source network. Additionally or alternatively, third module can determine the second handoff command is not received during the delay and inform the source network that the mobile device is leaving the source network. According to some aspects, processor 906 includes a fourth module that operates a timer to determine a length of the delay on the first handoff command.

System 900 can additionally comprise memory 910 operatively coupled to processor 906. Memory 910 can store information related to coordinating communications and any other suitable information. Memory 910 can additionally store protocols associated with handoff. Memory 910 of the various aspects is intended to comprise, without being limited to, these and any other suitable types of memory. System 900 can further comprise a symbol modulator 912, wherein transmitter 908 transmits the modulated signal.

Figure 10:
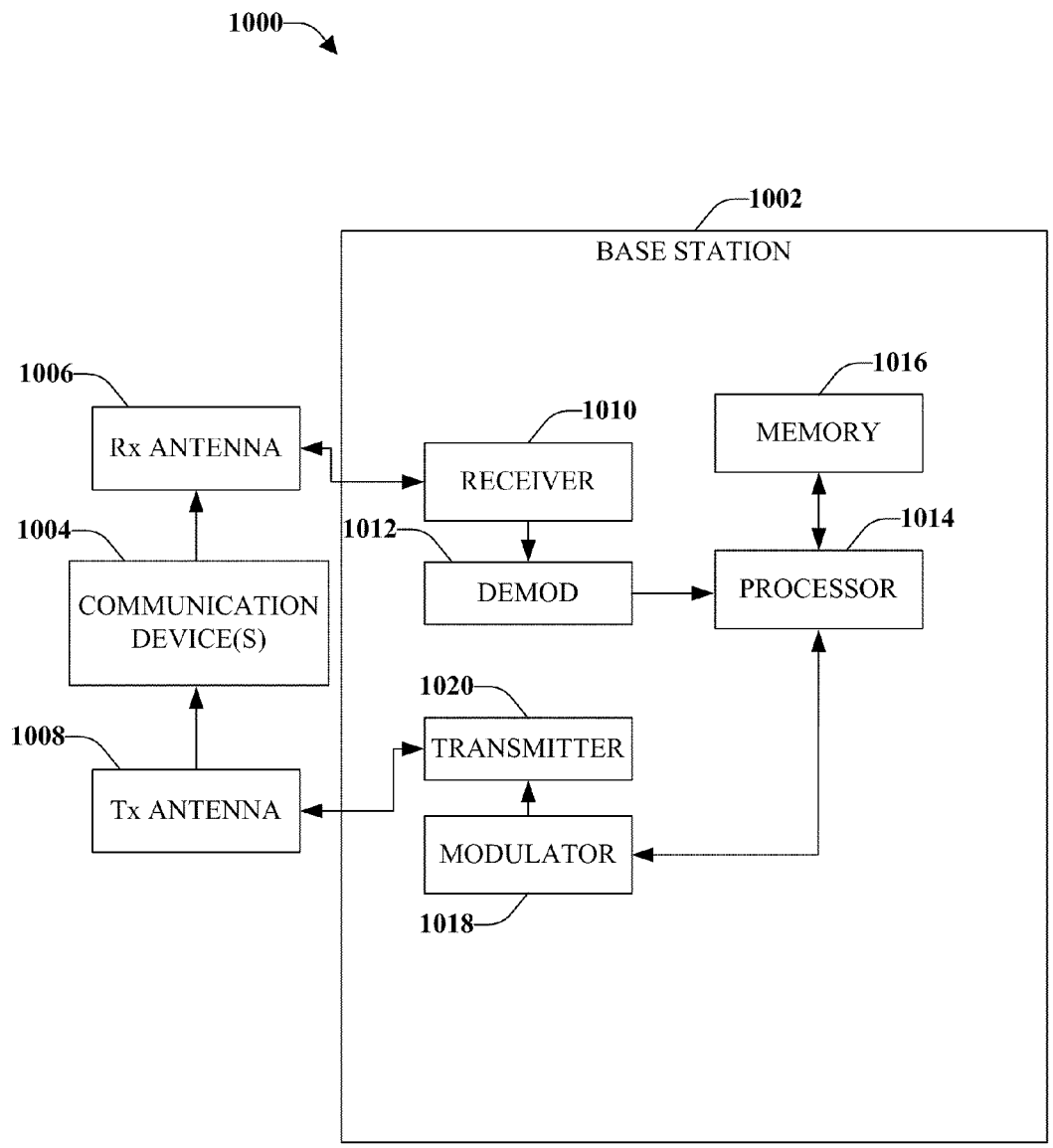
FIG. 10 illustrates a system that facilitates resource release at a source system during handoff to a multi-radio access technology target system, in accordance with various aspects presented herein.

FIG. 10 is an illustration of a system 1000 that facilitates resource release at a source system during handoff to a multi-radio access technology target system, in accordance with various aspects presented herein. System 1000 comprises a access point or base station 1002. As illustrated, base station 1002 receives signal(s) from one or more communication devices 1004 (e.g., user device) by a receive antenna 1006, and transmits to the one or more communication devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to coordinating handoff to a multi-radio access technology target system. A modulator 1018 can multiplex the signal for transmission by a transmitter 1020 through transmit antenna 1008 to communication devices 1004.

Processor 1014 can include a first module that receives a first message to trigger a first mobility procedure and a second module that delays action on the first message. Processor 1014 can also include a third module that determines a second message for a second mobility procedure is received during the delay, terminates the delay, and triggers the first mobility procedure and the second mobility procedure as a combined procedure. In accordance with some aspects, processor 1014 ascertains the second message is not received during the delay and proceeds with the first mobility procedure.

In accordance with some aspects, processor 1014 comprises a fourth module that sets a length of the delay to a first value if the first mobility procedure relates to a packet switched domain and to a second value if the first mobility procedure relates to a circuit switched domain.

Figure 11:
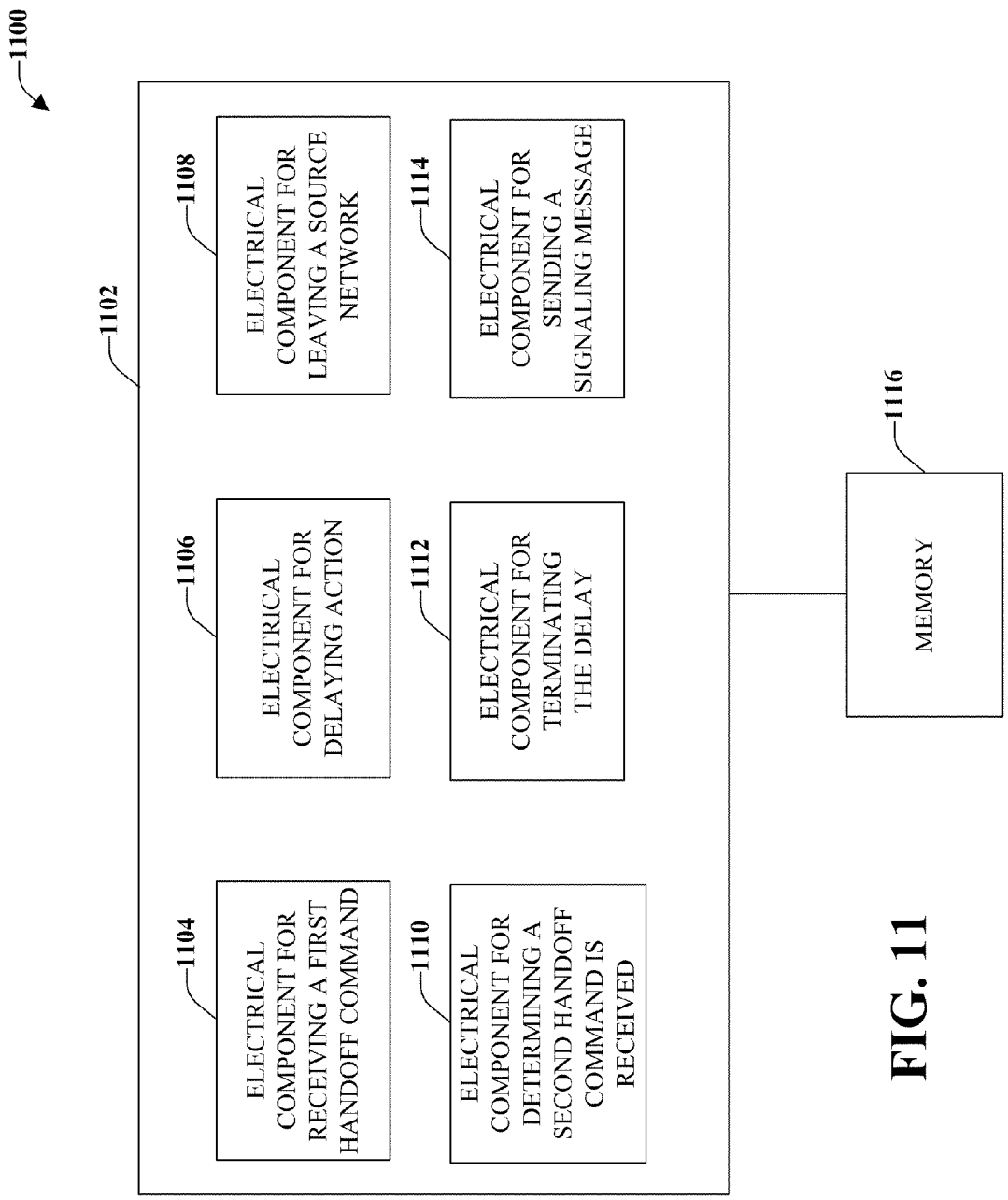
FIG. 11 illustrates an example system that coordinates handoff to a multi-radio access technology target system, according to an aspect.

With reference to FIG. 11, illustrated is an example system 1100 that coordinates handoff to a multi-radio access technology target system, according to an aspect. System 1100 may reside at least partially within a wireless communications apparatus, such as a mobile device. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. Logical grouping 1102 may include an electrical component 1104 for receiving a first handoff command based on a first target radio access technology allocation. Also included is an electrical component 1106 for delaying action on the first handoff command. Logical grouping 1102 also includes an electrical component 1108 for selectively leaving a source network as a function of the delay.

In accordance with some aspects, logical grouping 1102 can comprise an electrical component 1110 for determining a second handoff command for a second target radio access technology allocation is received during the delay and an electrical component 1112 for terminating the delay. Also included is an electrical component 1114 for sending to the source network a signaling message that indicates the wireless communications apparatus is leaving the source network.

According to some aspects, electrical component 1110 determines the second handoff command is not received during the delay. Electrical component 1114 informs the source network that a mobile device is leaving the source network.

Additionally, system 1100 can include a memory 1116 that retains instructions for executing functions associated with electrical components 1104-1114 or other components. While shown as being external to memory 1116, it is to be understood that one or more of electrical components 1104-1114 may exist within memory 1116.

Figure 12:
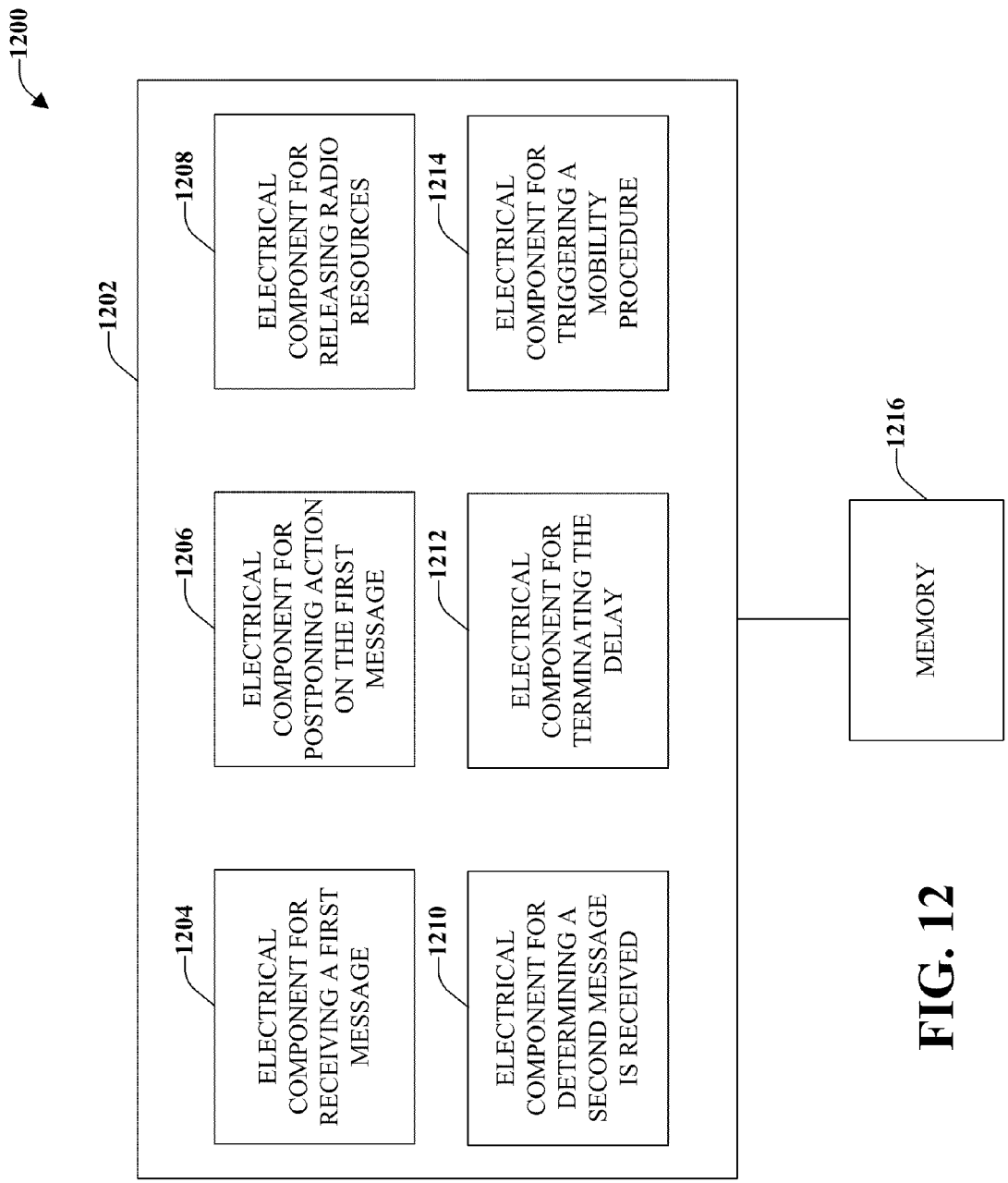
FIG. 12 illustrates an example system that coordinates handoff to a multi-radio access technology target system, according to an aspect.

With reference to FIG. 12, illustrated is an example system 1200 that coordinates handoff to a multi-radio access technology target system, according to an aspect. System 1200 may reside at least partially within a wireless communications apparatus, such as a source network. System 1200 is represented as including functional blocks, which may be functional blocks that represent functions implemented by a processor, software, or combination thereof (e.g., firmware).

System 1200 includes a logical grouping 1202 of electrical components that can act separately or in conjunction. Logical grouping 1202 may include an electrical component 1204 for receiving a first message for radio resource allocation for a first target radio access technology. Also included is an electrical component 1206 for postponing action on the first message. Logical grouping 1202 also includes an electrical component 1208 for selectively releasing resources as a function of a length of the delay.

In accordance with some aspects, logical grouping 1202 comprises an electrical component 1210 for determining a second message for a second target radio access technology is received during the delay. Also included is an electrical component 1212 for terminating the delay and an electrical component 1214 for triggering a first mobility procedure and a second mobility procedure as a combined procedure.

According to some aspects, electrical component 1210 determines second message is not received during the delay. Electrical component 1214 proceeds with a first mobility procedure.

Additionally, system 1200 can include a memory 1216 that retains instructions for executing functions associated with electrical components 1204-1214 or other components. While shown as being external to memory 1216, it is to be understood that one or more of electrical components 1204-1214 may exist within memory 1216.

Figure 13:
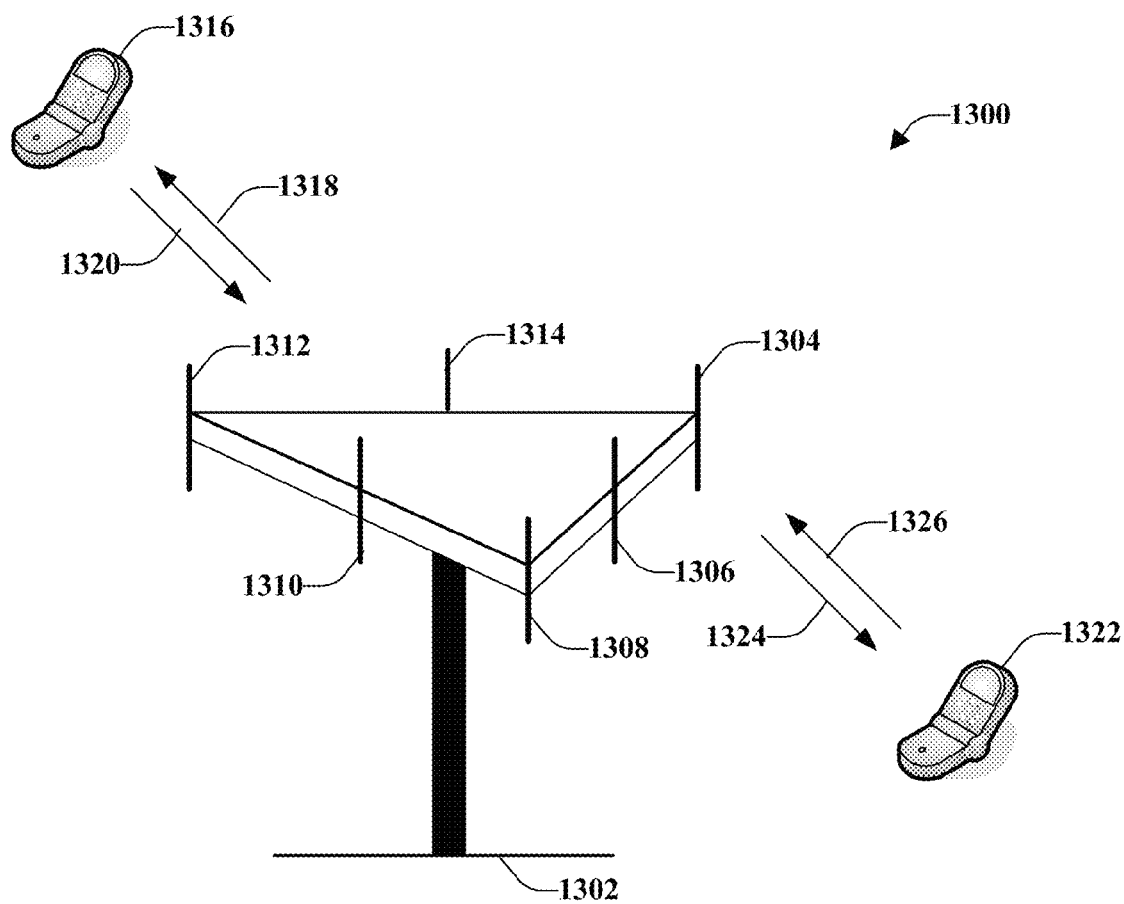
FIG. 13 illustrates a multiple access wireless communication system according to one or more aspects.

Referring now to FIG. 13, a multiple access wireless communication system 1300 according to one or more aspects is illustrated. A wireless communication system 1300 can include one or more base stations in contact with one or more user devices. Each base station provides coverage for a plurality of sectors. A three-sector base station 1302 is illustrated that includes multiple antenna groups, one including antennas 1304 and 1306, another including antennas 1308 and 1310, and a third including antennas 1312 and 1314. According to the figure, only two antennas are shown for each antenna group, however, more or fewer antennas may be utilized for each antenna group. Mobile device 1316 is in communication with antennas 1312 and 1314, where antennas 1312 and 1314 transmit information to mobile device 1316 over forward link 1318 and receive information from mobile device 1316 over reverse link 1320. Forward link (or downlink) refers to communication link from base stations to mobile devices, and reverse link (or uplink) refers to communication link from mobile devices to base stations. Mobile device 1322 is in communication with antennas 1304 and 1306, where antennas 1304 and 1306 transmit information to mobile device 1322 over forward link 1324 and receive information from mobile device 1322 over reverse link 1326. In a FDD system, for example, communication links 1318, 1320, 1324, and 1326 might utilize different frequencies for communication. For example, forward link 1318 might use a different frequency than the frequency utilized by reverse link 1320.

Each group of antennas and/or the area in which they are designated to communicate may be referred to as a sector of base station 1302. In one or more aspects, antenna groups each are designed to communicate to mobile devices in a sector or the areas covered by base station 1302. A base station may be a fixed station used for communicating with mobile devices.

In communication over forward links 1318 and 1324, transmitting antennas of base station 1302 can utilize beamforming in order to improve a signal-to-noise ratio of forward links for different mobile devices 1316 and 1322. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 14:
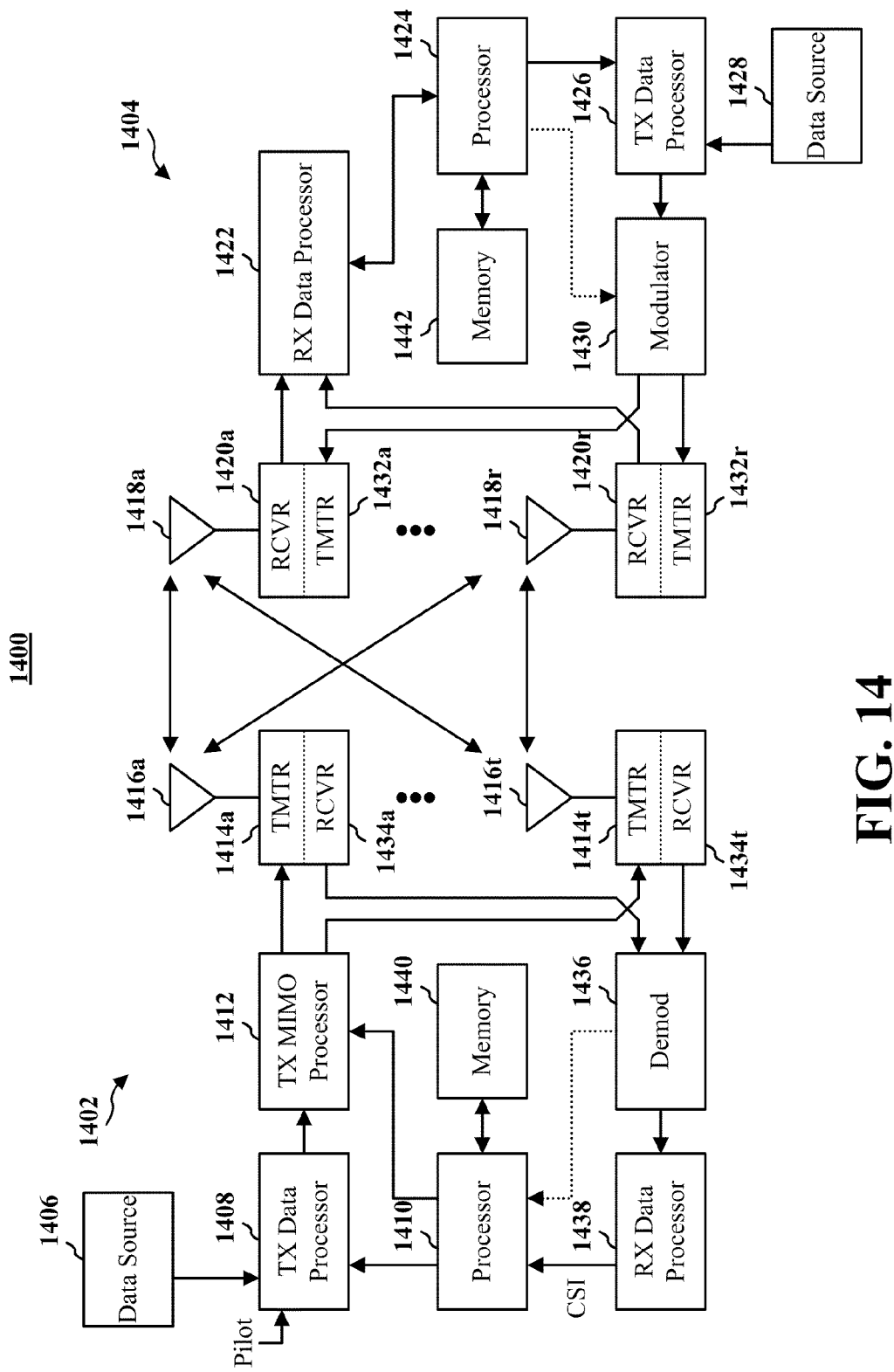
FIG. 14 illustrates an example wireless communication system.

FIG. 14 illustrates an example wireless communication system 1400. The wireless communication system 1400 depicts one base station 1402 and one mobile device 1404 for sake of brevity. However, it is to be appreciated that system 1400 can include more than one base station and/or more than one mobile device, wherein additional base stations and/or mobile devices can be substantially similar or different from example base station 1402 and mobile device 1404 described below. In addition, it is to be appreciated that base station 1402 and/or mobile device 1404 can employ the systems and/or methods described herein to facilitate wireless communication there between.

At base station 1402, traffic data for a number of data streams is provided from a data source 1406 to a transmit (TX) data processor 1408. According to an example, each data stream can be transmitted over a respective antenna. TX data processor 1408 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1404 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1410.

The modulation symbols for the data streams can be provided to a TX MIMO processor 1412, which can further process the modulation symbols (e.g., for OFDM). TX MIMO processor 1412 then provides NT modulation symbol streams to NT transmitters (TMTR) 1414*a* through 1414*t*. In various embodiments, TX MIMO processor 1412 applies beamforming weights to the symbols of the data streams and to the antenna from which the symbol is being transmitted.

Each transmitter 1414 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1414a through 1414t are transmitted from NT antennas 1416a through 1416t, respectively.

At mobile device 1404, the transmitted modulated signals are received by NR antennas 1418a through 1418r and the received signal from each antenna 1418 is provided to a respective receiver (RCVR) 1420a through 1420r. Each receiver 1420 conditions (e.g., filters, amplifies, and downconverts) a respective signal, digitizes the conditioned signal to provide samples, and further processes the samples to provide a corresponding "received" symbol stream.

An RX data processor 1422 can receive and process the NR received symbol streams from NR receivers 1420 based on a particular receiver processing technique to provide NT "detected" symbol streams. RX data processor 1422 can demodulate, deinterleave, and decode each detected symbol stream to recover the traffic data for the data stream. The processing by RX data processor 1422 is complementary to that performed by TX MIMO processor 1412 and TX data processor 1408 at base station 1402.

A processor 1424 can periodically determine which precoding matrix to utilize as discussed above. Further, processor 1424 can formulate a reverse link message comprising a matrix index portion and a rank value portion.

The reverse link message can comprise various types of information regarding the communication link and/or the received data stream. The reverse link message can be processed by a TX data processor 1426, which also receives traffic data for a number of data streams from a data source 1428, modulated by a modulator 1430, conditioned by transmitters 1432a through 1432r, and transmitted back to base station 1402.

At base station 1402, the modulated signals from mobile device 1404 are received by antennas 1416, conditioned by receivers 1434a though 1434t, demodulated by a demodulator 1436, and processed by a RX data processor 1438 to extract the reverse link message transmitted by mobile device 1404. Further, processor 1410 can process the extracted message to determine which precoding matrix to use for determining the beamforming weights.

Processors 1410 and 1424 can direct (e.g., control, coordinate, manage, etc.) operation at base station 1402 and mobile device 1404, respectively. Respective processors 1410 and 1424 can be associated with memory 1440 and 1442 that store program codes and data. Processors 1410 and 1424 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method for coordination of handoff to a multi-radio access technology target system, comprising:
   determining a length of a delay based at least in part on a quality-of-service information for services provided to a mobile device;
   receiving a first message to trigger a first mobility procedure, wherein the first mobility procedure includes a first radio resource allocation for a first target radio access technology (RAT) of the multi-radio access technology target system;
   delaying action on the first message for the determined length when radio resources are allocated for the first target RAT;
   initiating a timer for the determined length of the delay when the delaying is initiated; and
   performing one of the following:
   determining a second message for a second mobility procedure is received during the delay, wherein the second mobility procedure includes a second radio resource allocation for a second target RAT of the multi-radio access technology target system, terminating the timer, and triggering the first mobility procedure and the second mobility procedure as a combined procedure; or
   determining the second message is not received during the delay, and proceeding with the first mobility procedure.

2. The method of claim 1, further comprising:
   providing the services to the mobile device over packet-switched bearers.

3. The method of claim 1, further comprising:
   determining the length of the delay based at least in part on a network domain associated with the first mobility procedure.

4. The method of claim 3, further comprising:
   setting the length of the delay to a first value if the first mobility procedure relates to a packet-switched domain and to a second value if the first mobility procedure relates to a circuit-switched domain.

5. The method of claim 4, wherein the setting comprises setting the first value less than the second value.

6. The method of claim 1, further comprising suspending services that failed to be transferred due to a radio resource allocation failure of one of the first target RAT and the second target RAT.

7. The method of claim 1, wherein the triggering comprises triggering mobility procedures for different network domains.

8. The method of claim 1, wherein the triggering comprises triggering a circuit-switched handover and a packet-switched handover.

9. The method of claim 8, further comprising using the circuit-switched handover to provide a voice call on a radio access technology supporting circuit-switched voice.

10. The method of claim 1, wherein the timer is a QOS/service timer for handoff coordination to at least the first target RAT and the second target RAT.

11. The method of claim 1, wherein triggering the first mobility procedure and the second mobility procedure as a combined procedure comprises sending a handover command to the mobile device including the radio resources allocated for the first target RAT and the second target RAT.

12. A wireless communications apparatus, comprising:
   a memory that retains instructions for:
     determining a length of a delay based at least in part on a quality-of-service information for services provided to a mobile device;
     receiving a first message to trigger a first mobility procedure, wherein the first mobility procedure includes a first radio resource allocation for a first target radio access technology (RAT);
     delaying action on the first message for the determined length when radio resources are allocated for the first target RAT of the multi-radio access technology target system;
     initiating a timer for the determined length of the delay when the delaying is initiated; and
     performing one of the following:
       determining a second message for a second mobility procedure is received during the delay, wherein the second mobility procedure includes a second radio resource allocation for a second target RAT of the multi-radio access technology target system, terminating the timer, and triggering the first mobility procedure and the second mobility procedure as a combined procedure; or
       determining the second message is not received during the delay and proceeding with the first mobility procedure; and
   a processor, coupled to the memory, configured to execute the instructions retained in the memory.

13. The wireless communications apparatus of claim 12, the memory retains further instructions related to providing the services to the mobile device over packet-switched bearers.

14. The wireless communications apparatus of claim 12, the memory retains further instructions related to determining the length of the delay based at least in part on a network domain associated with the first mobility procedure.

15. The wireless communications apparatus of claim 14, the memory retains further instructions related to setting the length of the delay to a first value if the first mobility procedure relates to a packet-switched domain and to a second value if the first mobility procedure relates to a circuit-switched domain.

16. The wireless communications apparatus of claim 15, the memory retains further instructions related to setting the first value less than the second value.

17. The wireless communications apparatus of claim 14, the memory retains further instructions related to triggering a circuit-switched handover and a packet-switched handover.

18. The wireless communications apparatus of claim 17, the memory retains further instructions related to using the circuit-switched handover to provide a voice call on a RAT supporting circuit-switched voice.

19. A wireless communications apparatus that coordinates handoff to a multi-radio access technology target system, comprising:
   means for determining a length of a delay based at least in part on a quality-of-service information for services provided to a mobile device;
   means for receiving a first message to trigger a first mobility procedure, wherein the first mobility procedure includes a first radio resource allocation for a first target radio access technology (RAT) of the multi-radio access technology target system;
   means for postponing action on the first message for the determined length of the delay when radio resources are allocated for the first target RAT;
   means for initiating a timer for the determined length of the delay; and
   means for selectively releasing resources as a function of the length of the delay.

20. The wireless communications apparatus of claim 19, further comprising:
   means for determining a second message for a second mobility procedure is received during the delay, wherein the second mobility procedure includes a second radio resource allocation for a second target RAT of the multi-radio access technology target system;
   means for terminating the timer; and
   means for triggering the first mobility procedure and the second mobility procedure as a combined procedure.

21. The wireless communications apparatus of claim 19, further comprising:
   means for determining the second message is not received during the delay; and
   means for proceeding with the first mobility procedure.

22. A computer program product, comprising:
   a non-transitory computer-readable medium including a set of instructions for causing a computer to:
      determine a length of a delay based at least in part on a quality-of-service information for services provided to a mobile device;
      receive a first message to trigger a first mobility procedure, wherein the first mobility procedure includes a first radio resource allocation for a first target radio access technology (RAT);
      delay action on the first message for the determined length when radio resources are allocated for the first target RAT of the multi-radio access technology target system;
      initiate a timer for the determined length of the delay when the action on the first message is delayed; and
      release resources as a function of an expiration of the timer.

23. The computer program product of claim 22, the non-transitory computer-readable medium further including a set of instructions for causing the computer to:
      determine a second message for a second mobility procedure is received during the delay, wherein the second mobility procedure includes a second radio resource allocation for a second target RAT of the multi-radio access technology target system;
      terminate the timer; and
      a trigger the first mobility procedure and the second mobility procedure as a combined procedure.

24. The computer program product of claim 22, the non-transitory computer-readable medium further including a set of instructions for causing the computer to:
      determine the second message is not received during the delay; and
      proceed with the first mobility procedure.

25. At least one processor configured to coordinate handoff to a multi-radio access technology target system, comprising:
   a first module that determines a length of a delay based at least in part on a quality-of-service information for services provided to a mobile device;
   a second module that receives a first message to trigger a first mobility procedure, wherein the first mobility procedure includes a first radio resource allocation for a first target radio access technology (RAT);
   a third module that delays action on the first message for the determined length when radio resources are allocated for the first target RAT of the multi-radio access technology target system;
   a fourth module that initiate a timer for the determined length of the delay when the action on the first message is delayed; and
   a fifth module, comprising hardware, that performs one of the following:
      determine a second message for a second mobility procedure is received during the delay, wherein the second mobility procedure includes a second radio resource allocation for a second target RAT of the multi-radio access technology target system, terminate the timer, and trigger the first mobility procedure and the second mobility procedure as a combined procedure; or
      ascertain the second message is not received during the delay, and proceed with the first mobility procedure.

26. The at least one processor of claim 25, further comprising:
   a sixth module that sets the length of the delay to a first value if the first mobility procedure relates to a packet switched domain and to a second value if the first mobility procedure relates to a circuit switched domain.

27. A method for coordination of handoff to a multi-radio access technology target system, comprising:
   receiving at a mobile device a first handoff command based on a first target radio access technology (RAT) allocation of the multi-radio access technology target system;
   delaying action on the first handoff command;
   initiating a timer at the mobile device for a duration of a delay; and
   performing one of the following:
      determining a second handoff command for a second target RAT allocation of the multi-radio access technology target system is received during the delay, terminating the timer, and sending to a source network a signaling message that indicates the mobile device is leaving the source network; or determining the second handoff command for the second target RAT is not received during the delay, and informing the source network that the mobile device is leaving the source network; and receiving an indication that at least one service is suspended when the at least one service failed to transfer to the second target RAT.

28. The method of claim 27, wherein the operating comprises:

receiving a value of a network timer; and setting the timer at a value that is less than the value of the network timer.

29. The method of claim 27, wherein the operating comprises:

receiving a value of a network timer; and setting the timer at a value that is equal to the value of the network timer.

30. The method of claim 27, wherein the delaying comprises postponing the first handoff command in anticipation of receiving the second handoff command.

31. The method of claim 27, wherein the delaying comprises coordinating handoff to a first RAT and a RAT.

32. The method of claim 27, wherein the timer is initiated in response to receiving the first handoff command.

33. The method of claim 27, wherein receiving the indication that at least one service is suspended comprises receiving the indication when the at least one service failed to transfer to the second target RAT during the duration of the delay.

34. A wireless communications apparatus, comprising:

a memory that retains instructions for:

receiving a first handoff command based on a first target radio access technology (RAT) allocation of the multi-radio access technology target system, delaying action on the first handoff command;

initiating a timer for a duration of a delay;

performing one of the following:

determining a second handoff command for a second target RAT allocation of the multi-radio access technology target system is received during the delay, terminating the timer, and sending to a source network a signaling message that indicates the wireless communications apparatus is leaving the source network; or determining the second handoff command for the second target RAT is not received during the delay and informing the source network that the mobile device is leaving the source network; and receiving an indication that at least one service is suspended when the at least one service failed to transfer to the second target RAT; and a processor, coupled to the memory, configured to execute the instructions retained in the memory.

35. The wireless communications apparatus of claim 34, wherein the memory retains further instructions related to receiving a value of a network timer and setting the timer at a value that is less than the value of the network timer.

36. The wireless communications apparatus of claim 34, wherein the memory retains further instructions related to receiving a value of a network timer and setting the timer at a value that is equal to the value of the network timer.

37. The wireless communications apparatus of claim 34, wherein the memory retains further instructions related to postponing the first handoff command in anticipation of receiving the second handoff command.

38. The wireless communications apparatus of claim 34, wherein the memory retains further instructions related to coordinating handoff to the first RAT and the second RAT.

39. A wireless communications apparatus that coordinates handoff to a multi-radio access technology target system, comprising:

means for receiving a first handoff command based on a first target radio access technology (RAT) allocation of the multi-radio access technology target system;

means for delaying action on the first handoff command;

means for initiating a timer for a duration of a delay;

means for selectively leaving a source network as a function of the delay; and means for receiving an indication that at least one service is suspended when the at least one service failed to transfer to a second target RAT of the multi-radio access technology target system.

40. The wireless communications apparatus of claim 39, further comprising:

means for determining a second handoff command for the second target RAT allocation is received during the delay;

means for terminating the timer; and means for sending to the source network a signaling message that indicates the wireless communications apparatus is leaving the source network.

41. The wireless communications apparatus of claim 39, further comprising:

means for determining a second handoff command for the second target RAT is not received during the delay; and means for informing the source network that a mobile device is leaving the source network.

42. A computer program product, comprising:

a non-transitory computer-readable medium including a set of instructions for causing a computer to:

receive a first handoff command based on a first target radio access technology (RAT) allocation of the multi-radio access technology target system;

delay action on the first handoff command;

initiate a timer for a duration of a delay;

selectively convey to a source system an indication that a device is leaving the source system; and receive an indication that at least one service is suspended when the at least one service failed to transfer to a second target RAT of the multi-radio access technology tar et system.

43. The computer program product of claim 42, the non-transitory computer-readable medium further including a set of instructions for causing the computer to:

determine a second handoff command for the second target RAT allocation is received during the delay;

terminate the timer; and send to the source system a signaling message that indicates the device is leaving the source system.

44. The computer program product of claim 42, the non-transitory computer-readable medium further including a set of instructions for causing the computer to:

determine a second handoff command for the second target RAT is not received during the delay; and inform the source system that the device is leaving the source system.

45. At least one processor configured to coordinate handoff to a multi-radio access technology target system, comprising:

a first module that receives at a mobile device a first handoff command based on a first target radio access technology (RAT) allocation of the multi-radio access technology target system;

a second module for initiating a timer at a mobile device for a duration of a delay;
a third module that delays action on the first handoff command for the duration; and
a third module, comprising hardware, that performs one of the following:
   determines a second handoff command for a second target RAT allocation of the multi-radio access technology target system is received during the delay, terminates the timer, and sends to a source network a signaling message that indicates the mobile device is leaving the source network; or
   determines the second handoff command for the second target RAT is not received during the delay, and informs the source network that the mobile device is leaving the source network; and
a fourth module that receives an indication that at least one service is suspended when the at least one service failed to transfer to the second target RAT.

* * * * *